United States Patent [19]
Bertram et al.

[11] 4,367,328
[45] Jan. 4, 1983

[54] EPOXY RESINS FROM HYDROXY BENZAMIDES

[75] Inventors: James L. Bertram, Lake Jackson, Tex.; Edmund P. Woo, Midland, Mich.

[73] Assignee: The Dow Chemical Company, Midland, Mich.

[21] Appl. No.: 240,742

[22] Filed: Mar. 5, 1981

[51] Int. Cl.³ .................. C08G 59/28; C08G 59/32
[52] U.S. Cl. .................................... 528/98; 252/182; 528/99; 528/100; 549/553
[58] Field of Search ............... 260/348.43, 348.46, 260/348.47; 528/99, 98, 100; 549/553; 252/182

[56] References Cited

U.S. PATENT DOCUMENTS

| | | |
|---|---|---|
| 2,730,531 | 1/1956 | Payne et al. ................. 260/348 |
| 3,042,692 | 7/1962 | Findley ................. 260/348.47 X |
| 3,562,297 | 2/1971 | Howe et al. ............ 260/348.46 X |
| 3,798,242 | 3/1974 | Batzer et al. ............. 260/348 A |
| 3,840,598 | 10/1974 | Lesher ................ 260/348.47 X |
| 3,904,658 | 9/1975 | Batzer et al. ............. 260/348 A |

*Primary Examiner*—Earl A. Nielsen
*Attorney, Agent, or Firm*—J. G. Carter

[57] ABSTRACT

New epoxy resins are prepared by reacting a hydroxybenzamide or derivative thereof with an epihalohydrin followed by dehydrohalogenation. These epoxy resins have crystalline melting points, self-cure at elevated temperatures and cure rapidly in the presence of the usual epoxy resin curing agents. Also disclosed are hydrolyzed products of these epoxy resins and subsequent reactions with polyisocyanates.

4 Claims, No Drawings

EPOXY RESINS FROM HYDROXY BENZAMIDES

BACKGROUND OF THE INVENTION

Epoxy resins have been prepared from amides as disclosed in U.S. Pat. Nos. 3,798,242 (Batzer et al.), 3,904,658 (Batzer et al.) and 2,730,531 (Payne et al.). However, these resins suffer such deficiencies as poor cure rates with conventional epoxy resin curing agents, do not readily self-cure and are difficult to prepare which results in poor yields with more undesirable side reaction products.

It has now been discovered that the epoxy resins of the present invention will self-cure at elevated temperatures, cure with conventional epoxy resin curing agents resulting in high temperature performance properties. The resins of the present invention are typically crystalline in character with sharp melting points and low melt viscosities which renders them particularly suitable for powder coating applications and injection molding applications.

SUMMARY OF THE INVENTION

The present invention concerns epoxy resins or mixtures of epoxy resins represented by the formulas I, II or III; wherein each R is a divalent hydrocarbyl group having from 1 to about 18, preferably from about 2 to about 12 and most preferably from about 2 to about 6 carbon atoms, a group represented by the formulas IV, V, VI or VII or R can combine with $R^1$ so as to form a stable heterocyclic ring with the nitrogen atoms; each A is independently a divalent hydrocarbyl group having from 1 to about 10, preferably from 1 to about four carbon atoms, —O—, —S—, —S—S—,

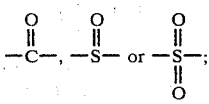

each $R^1$ is independently hydrogen, a 2,3,-epoxypropyl group, a 2-alkyl-2,3-epoxypropyl group, a monovalent hydrocarbyl group or a hydroxyl substituted monovalent hydrocarbyl group, said hydrocarbyl groups having from 1 to about 9 carbon atoms, said alkyl having from 1 to about 4, preferably 1 to about 3 carbon atoms; each $R^2$ is independently hydrogen or an alkyl group having from 1 to about 4, preferably 1 to about 3 carbon atoms; each $R^3$ is independently hydrogen or an alkyl group having from 1 to about 4 carbon atoms; each $R^4$ is independently hydrogen, a hydrocarbyl or halogen substituted hydrocarbyl group having from 1 to about 9, preferably from 1 to about 2 carbon atoms; each $R^8$ is independently selected from the group represented by formula XIV or the same groups as $R^1$ except that $R^8$ cannot be a hydrogen; each $R^9$ is independently a divalent hydrocarbyl group having from 2 to about 4, preferably 2 carbon atoms; each X is independently hydrogen, chlorine, bromine or a hydrocarbyl or a hydrocarbyloxy group having from 1 to about 9, preferably 1 to about 6 carbon atoms; each m independently has a value of zero or 1; n has an average value of from about 0.01 to about 6, preferably 0.1 to about 4; p has an average value of from 1 to about 10, preferably from 1 to about 3; q has an average value of at least 1, preferably from 1 to about 150, most preferably from 1 to about 100 and usually from 1 to about 10 and each y and z independently has a value of 1 or 2.

The present invention also concerns halohydrin intermediate products represented by the formulas VIII, IX or X wherein each R, $R^2$, $R^3$, $R^4$, X, n, m, p, q, y and z are as defined above except that R can be combined with $R^5$, instead of $R^1$, so as to form a stable heterocyclic ring with the nitrogen atoms and each $R^5$ is independently hydrogen, a 2-hydroxy-3-halopropyl group, a 2-alkyl-2-hydroxy-3-halopropyl group, a monovalent hydrocarbyl group or a hydroxyl substituted monovalent hydrocarbyl group, said hydrocarbyl groups having from 1 to about 9 carbon atoms, preferably 1 to about 4 carbon atoms, said alkyl having from 1 to about 4, preferably 1 to about 2 carbon atoms; each $R^8$ is independently selected from the group represented by formula XV or the groups represented by $R^5$, except that $R^8$ cannot be hydrogen; each $R^9$ is a divalent hydrocarbyl group having from 2 to about 4, preferably 2 carbon atoms; and each X' is independently a halogen atom, preferably chlorine or bromine, most preferably chlorine.

Also, the present invention concerns intermediate reaction products containing at least one 2,3-epoxypropyl, 2,3-epoxypropoxy, 2-alkyl-2,3-epoxypropyl or 2-alkyl-2,3-epoxypropoxy group per molecule and at least one 2-hydroxy-3-halopropyl, 2-alkyl-2-hydroxy-3-halopropyl, 2-hydroxy-3-halopropoxy or 2-alkyl-2-hydroxy-3-halopropoxy group per molecule represented by the formulas XI, XII and XIII wherein each R, $R^3$, $R^4$ X, n, m, p, q, y and z are independently as defined above; each $R^6$ is independently a 2,3-epoxypropyl, a 2-alkyl-2,3-epoxypropyl, a 2-hydroxy-3-halopropyl or a 2-alkyl-2-hydroxy-3-halopropyl group, said alkyl having from 1 to about 4 carbon atoms; each $R^7$ is independently hydrogen, a monovalent hydrocarbyl group, a hydroxyl substituted monovalent hydrocarbyl group, said hydrocarbyl groups having from 1 to about 9 carbon atoms or a group defined by $R^6$ and each $R^8$ is independently selected from a group represented by formula XVI or a group represented by $R^6$; with the proviso that at least one of $R^6$ or $R^7$ is a 2-alkyl-2,3-epoxypropyl or a 2,3-epoxypropyl group and at least one of $R^6$ or $R^7$ is a 2-hydroxy-3-halopropyl or 2-alkyl-2-hydroxy-3-halopropyl group.

Further, the present invention concerns vicinal dihydroxyl-containing material represented by the formulas VIII, IX or X wherein each R, $R^2$, $R^3$, $R^4$, X, n, m, p, q, y and z are as defined above except that R can be combined with $R^5$, instead of $R^1$, so as to form a stable heterocyclic ring with the nitrogen atoms and each $R^5$ is independently hydrogen, a 2,3-dihydroxypropyl group, a 2-alkyl-2,3-dihydroxypropyl group, a monovalent hydrocarbyl group or a hydroxyl substituted monovalent hydrocarbyl group, said hydrocarbyl groups having from 1 to about 9 carbon atoms, preferably 1 to about 4 carbon atoms, said alkyl having from 1 to about 4, preferably 1 to about 2 carbon atoms; each $R^8$ is independently selected from the group represented by formula XV or the groups represented by $R^5$, except that $R^8$ cannot be hydrogen; each $R^9$ is a divalent hydrocarbyl group having from 2 to about 4, preferably 2 carbon atoms; and each X' is a hydroxyl group.

The present invention further concerns cured compositions resulting from curing the epoxy resins described above with a curing quantity of a suitable curing agent.

Still further, the present invention pertains to the cured compositions resulting from self curing the epoxy resins of the present invention.

Further still, the present invention concerns polyols prepared from the vincinal dihydroxyl-containing material and the reaction product of the vicinal dihydroxyl-containing material, the polyols prepared therefrom or mixtures thereof with one or more polyisocyanates.

DESCRIPTION OF THE PREFERRED EMBODIMENTS

The epoxy resins and intermediate products of the present invention are prepared by reacting a hydroxybenzamide or hydroxybenzamide derivative with an epihalohydrin or alkylepihalohydrin and subsequently dehydrohalogenating the resultant halohydrin product thereby forming an epoxy resin which is recovered by the usual means such as water washing and the like.

The hydroxy substituted benzoic acid amides and derivatives thereof can suitably be prepared by reacting the desired amine with the desired hydroxyl substituted benzoic acid, ester or anhydride thereof at an elevated temperature, suitably at a temperature of from about 150° C. to about 160° C. for a time sufficient to substantially complete the reaction, usually from about 4 to about 12 hours. The ratio of the hydroxy benzoic acid, ester or anhydride thereof to the amine is that which will provide at least 1, preferably from about 1 to about 2, acid or ester groups or at least 0.5, preferably from about 1 to about 2, anhydride groups contained in the hydroxy benzoic acid, ester or anhydride per reactive amine hydrogen contained in the amine.

Preparation of the disalicylamides is disclosed by Spacht in U.S. Pat. No. 3,034,879 which is incorporated herein by reference.

The polysalicylamides employed in the preparation of the compositions of the present invention can suitably be prepared as above except that a acetylsalicyloyl halide, preferably the chloride, is employed instead of a hydroxyl substituted benzoic acid, ester or anhydride as mentioned above.

Particularly suitable hydroxy benzoic acids, which can be employed herein include, for example, o-, m- or p-hydroxybenzoic acid, brominated o-, m- or p-hydroxybenzoic acid or mixtures thereof.

Also suitable are the anhydrides, either cyclic or linear, of the above mentioned hydroxybenzoic acids or halogenated, hydrocarbyl or hydrocarbyloxy derivatives thereof as well as the hydrocarbyl esters thereof, either aliphatic, cycloaliphatic or aromatic, wherein said hydrocarbyl or hydrocarbyloxy groups contain from 1 to about 9 carbon atoms.

Particularly suitable amines which can be employed include, for example, ethylenediamine, 1,2-propylenediamine, 1,3-propylenediamine, 1,2-butanediamine, 1,4-butanediamine, hexamethylenediamine, diethylenetriamine, triethylenetetramine, tetraethylenepentamine, methylene dianiline, 2,4-toluenediamine, 2,6-toluenediamine, polymethylene polyphenylamine, mixtures thereof and the like.

Suitable epihalohydrins include, for example, epichlorohydrin, epibromohydrin, epiiodohydrin, methylepichlorohydrin, methylepibromohydrin, methylepiiodohydrin, ethylepichlorohydrin, ethylepibromohydrin, ethylepiiodohydrin, mixtures thereof and the like.

Suitable catalysts for use in reacting the hydroxybenzamide compounds with the epihalohydrin include, for example, tertiary amines, quaternary ammonium compounds, tertiary phosphines, quaternary phosphonium compounds, alkali metal hydroxides and the like such as, for example, triethylamine, tributylamine, dimethylbenzylamine, 2-hydroxyethyl dimethylamine, benzyltrimethylammonium chloride, benzyltrimethylammonium hydroxide, tributylphosphine, tetrabutylphosphonium chloride, tetrabutylphosphonium acetate, tetrabutylphosphonium acetate acetic acid complex, ethyltriphenylphosphonium chloride, ethyltriphenylphosphonium iodide, ethyltriphenylphosphonium acetate, ethyltriphenylphosphonium acetate.acetic acid complex, sodium hydroxide, mixtures thereof and the like.

Suitable dehydrohalogenating agents include, for example, sodium hydroxide, potassium hydroxide, mixtures thereof with sodium carbonate and the like.

Suitable curing agents which can be employed to cure the epoxy resins of the present invention include, for example, amines, carboxylic acids and anhydrides thereof, amides, imidazoles, phenolic hydroxy-containing compounds, mixtures thereof and the like. Likewise, if desired, catalysts and/or accelerators can be employed to enhance the curing of the epoxy resins. These curing agents, catalysts and accelerators are more fully disclosed in *Handbook of Epoxy Resins*, Lee and Nevill, McGraw-Hill Book Co., 1967 which is incorporated herein by reference. Particularly suitable curing agents include, for example, ethylene diamine, diethylenetriamine, triethylene tetramine, methylene dianiline, Nadic methyl anhydride, phthalic anhydride, 2-methylimidazole, mixtures thereof and the like.

The vincinal dihydroxyl-containing materials can be readily prepared by hydrolyzing the corresponding vicinal epoxy-containing products as described by Walker in U.S. Pat. No. 3,405,093; Irwin and Erickson in U.S. Pat. Nos. 3,891,525 and 3,991,028; and by Chen in U.S. Pat. No. 4,145,324 all of which are incorporated herein by reference.

These vicinal dihydroxyl-containing materials are useful in forming polyurethanes and isocyanate-containing and/or polythioisocyanate products by reaction with polyisocyanates and/or polyisothiocyanates and the preparation of higher molecular weight polyols by reaction with one or more alkylene oxides or vicinal epoxy-containing compounds such as ethylene oxide, propylene oxide, 1,2-butylene oxide, 2,3-butylene oxide, epichlorohydrin, epibromohydrin, epiiodohydrin, mixtures thereof and the like. The reaction can be conveniently carried out in the presence of an alkali metal hydroxide such as sodium or potassium hydroxide.

The preparation of polyols and the preparation of polyurethanes and NCO-containing prepolymers from polyols and polyisocyanates are described by Saunders and Frisch in *POLYURETHANES: CHEMISTRY AND TECHNOLOGY II. TECHNOLOGY,* Interscience, 1964, which is incorporated herein by reference.

These vicinal-dihydroxyl-containing products can also be employed in those applications employing hydrolyzed epoxy resins as described by Walker in U.S. Pat. Nos. 3,632,836 and 3,787,508; Irwin and Erickson in U.S. Pat. Nos. 3,891,525 and 3,991,028; and Chen in U.S. 4,145,324 all of which are incorporated herein by reference.

The compositions of the present invention can also be employed with suitable fillers, pigments, dyes, flow control agents or other additives as desired in formulating into suitable uses such as in coatings, castings and the like.

The epoxy resins of the present invention are useful in the preparation of powder coatings, coatings or finishes for glass fibers, reinforced laminates, reaction injection molding and the like.

FORMULA I
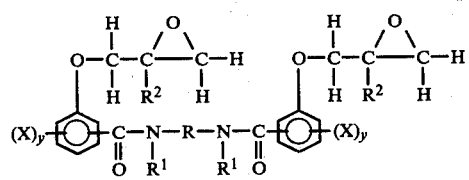

FORMULA II
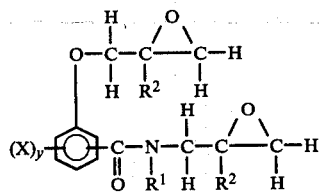

FORMULA III
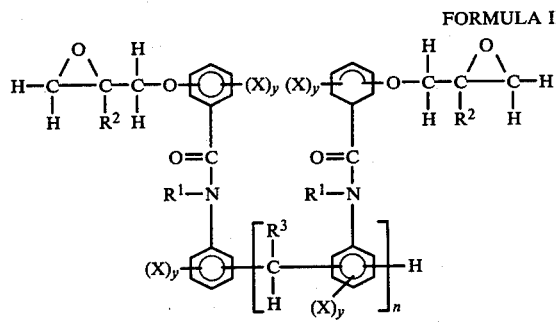

FORMULA IV
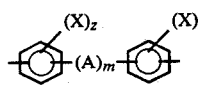

FORMULA V
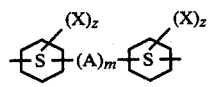

FORMULA VI
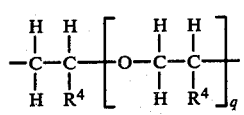

FORMULA VII
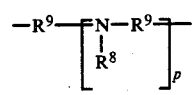

FORMULA VIII
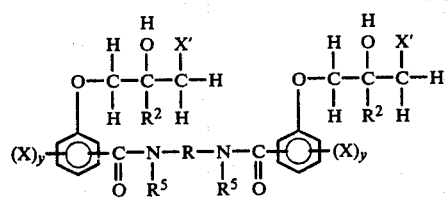

FORMULA IX
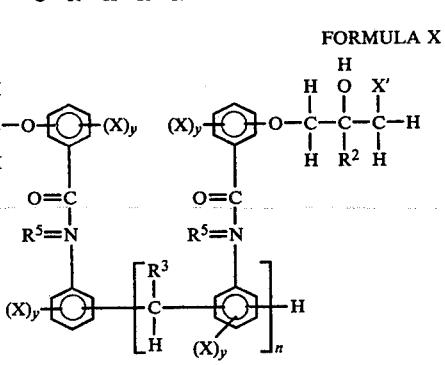

FORMULA X
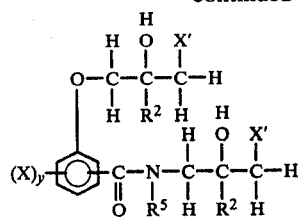

FORMULA XI
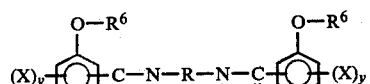

FORMULA XII

FORMULA XIII
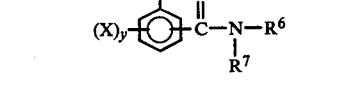
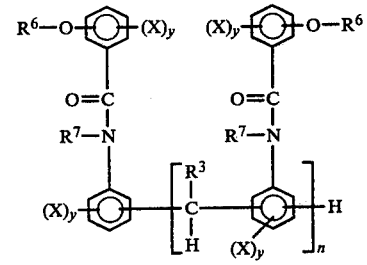

FORMULA XIV
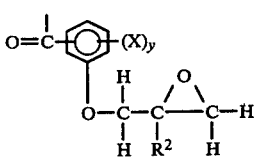

FORMULA XV
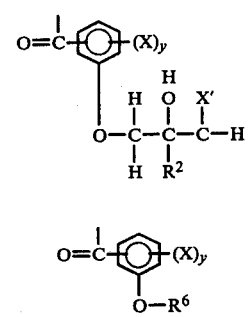

FORMULA XVI

The following examples are illustrative of the present invention but are not to be construed as to limiting the scope thereof in any manner.

The properties of the epoxy resins were obtained by the following procedures.

Procedure for Resin Shelf Stability

Resins were maintained at 25° C. for 1 to 12 months. The epoxy content was periodically determined by titration. The epoxy content at any given time subtracted from the initial epoxy content divided by the initial epoxy content times 100 gives the total percent change. That value divided by the number of months then gives the percent change in epoxy content per month.

Procedure for Curing Resins

Self-cure: Resin was placed in a suitable mold and heated at 150° C. for 16 hours then post-cured at 200° C. for an additional one hour.

Methylene Dianiline Cure: The epoxy amide was heated at a temperature sufficiently above its melting point to give a thin fluid system, usually 70°–150° C. The methylene dianiline (stoichiometric amount) was melted, approximately 90° C. The epoxy and methylene dianiline were then quickly poured together and mixed before transferring to an appropriate mold. The molds were heated at 150° C. for one hour, then post-cured at 200° for an additional hour.

Nadic Methyl Anhydride Cure: The anhydride (0.85 equivalents per epoxy equivalent) and resin were heated separately at 150° C. then quickly mixed together and poured into the appropriate mold. The molds were heated at 150° C. for one hour, then post-cured at 200° C. for an additional one hour.

Procedure for Gel Time

The epoxy resin with an appropriate amount of curing agent (total mass approximately one gram) was placed on a hot plate with a surface temperature of 150° C. The time required for the mass to become nonflowable was recorded as the gel time.

Liquid Chromatography Analysis

Analyses were run on a Water Associates Liquid Chromatograph. The column was a Water Associates Micro-Bondipak $C_{18}$ reverse phase, 1¼ inch by 30 cm.

The flow rate was 1.5 ml per minute programming from 50% acetonitrile, 50% water to 68% acetonitrile, 32% water during 10 minutes.

Procedure for Glass Transition Temperature (Tg)

Analyses for Tg were run on a Perkin-Elmer Thermomechanical Analyzer, Model TMS-b 1. The general procedure for determining Tg via expansion was followed. This procedure is described in *Journal of Paint Technology*, Vol. 40, 167–178; 1969 which is incorporated herein by reference. Samples were heated at a rate of 20°/min. in a nitrogen atmosphere. The temperature of the first deflection in the expansion cure was taken as the glass transition temperature.

EXAMPLE 1

General Procedure for Synthesis of Bis-Salicylamides

A mixture of two moles of phenyl salicylate and one mole of the appropriate diamine is heated at 150°–160° C. with stirring under nitrogen for 4–12 hours. The phenol liberated is removed either via washing with toluene or vacuum distillation. The residue is purified by recrystallization. Aliphatic diamines generally require 4–5 hours of heating while the sterically hindered 2,6-diaminotoluene requires 12 hours. The overall yields are 75–90% after purification. Aliphatic diamines can be used as received but aromatic diamines should be purified by vacuum distillation from zinc dust.

EXAMPLE 2

Preparation of the Triepoxide of Salicylamide

Salicylamide, 64.0 g (0.467 moles), 777 g (8.4 moles) of epichlorohydrin, and 3.89 g (0.021 moles) of benzyltrimethylammonium chloride were stirred at 60° C. under a vacuum of 95 mm of Hg. Fifty percent aqueous sodium hydroxide 134.4 g (168 moles) was slowly added during approximately 2½ hours while simultaneously removing the water as an azeotroped with epichlorohydrin. The epichlorohydrin was separated from the water and continuously returned to the reaction mixture. After all of the sodium hydroxide had been added, the reaction was stirred for an additional 30 minutes at 60° C., then cooled, and the salt formed was removed by filtration. The epichlorohydrin solution was washed with water until free of salt and caustic. The epichlorohydrin was removed by vacuum distillation to yield 133.4 g (94.6% of theory) of a ±light yellow viscous liquid. The epoxide content was 30.53%. The resin had a shelf stability of 14.8% change in epoxy content per month as tested over a two (2) month period.

EXAMPLE 3

Preparation of the Diglycidyl Ether of Ethylenediamine Bis(Salicylamide)

Ethylenediamine bis(salicylamide) 120.0 grams (0.4 moles) was stirred at 60° C. with 444.0 grams (4.8 moles) of epichlorohydrin and 1.85 grams of a 60% aqueous solution of benzyltrimethylammonium chloride for 96 hours. The reaction was monitored by liquid chromatography. At the end of 96 hours, the solution contained approximately 15% of the dichlorohydrin adduct, 40% of the monoepoxy-monochlorohydrin adduct, 38% of the diepoxy adduct and 7% of higher molecular weight homologues.

Then 222 grams of methylene chloride was added to the above solution of the adducts in epichlorohydrin followed by the addition of 250 grams of an aqueous solution of 16.0% sodium hydroxide and 9.0% sodium carbonate solution and the mixture was stirred at 30° C. for 1½ hours. The organic layer was separated from the aqueous layer, an additional 222 grams of methylene chloride was added and again treated with the same amount of aqueous caustic-carbonate solution for 1 hour at 30° C. The organic phase was again separated from the aqueous layer and washed with additional water till free of caustic and salt. The excess epichlorohydrin was then removed by vacuum distillation to yield 164.5 grams of the desired product, 99.8% yield. The crystalline product has a melting point of 138°–144° C. The shelf stability was 0.54% change in epoxy content per month as tested over a thirteen (13) month period.

EXAMPLE 4

Preparation of the Diglycidylether of Propylenediamine Bis(Salicylamide)

Propylenediamine bis(salicylamide) 78.5 grams (0.25 moles) was stirred at 60° C. with 277.5 grams (3 moles) of epichlorohydrin and 1.16 grams of a 60% aqueous solution of benzyltrimethylammonium chloride for 22 hours. Liquid chromatography analysis indicated the resultant product to contain approximately 16% of the dichlorohydrin adduct, 43% of the monoepoxymonochlorohydrin adduct and about 41% of the diepoxy adduct.

Then 156 grams of an aqueous solution containing 16.0% of sodium hydroxide and 9.0% sodium carbonate was added to the above epichlorohydrin solution of the adducts and the mixture stirred at 30° C. for 1½ hours. The organic layer was then separated, and again stirred with the same amount of caustic-carbonate solution for one hour at 30° C. The organic phase was then washed with water till free of caustic and salt. The excess epichlorohydrin was then vacuum distilled to yield 105.4 grams of the desired product (99% yield). The crystalline product melted at 88°–90° C.

EXAMPLE 5

Preparation of the Diglycidylether of 2,4-toluenediamine Bis(Salicylamide)

The above 2,4-toluenediamine bis(salicylamide), 9.05 g (0.025 moles) was stirred with 46.25 g (0.5 moles) of epichlorohydrin and 0.23 g (0.00075 moles) of a 60% aqueous solution of benzyltrimethylammonium chloride at 60° C. for 138 hours. Liquid chromotography showed no significant change in resin chlorohydrin distribution after approximately 60 hours.

The above epichlorohydrin solution was then stirred at 30° C. for 90 minutes with an aqueous solution consisting of 16.0% sodium hydroxide and 9.0% sodium carbonate. The organic layer was separated and again stirred with the same amount of aqueous caustic-carbonate solution for 30 minutes at 30° C. The organic layer was then separated, water washed until free of salt and caustic, then the epichlorohydrin removed by vacuum distillation to yield 11.8 g. (99.6% of theory) of a dark colored semisolid containing 19.82% epoxide.

EXAMPLE 6

Preparation of the Diglycidylether of 2,6-toluenediamine Bis(Salicylamide)

Same amounts and ratio of reactants as used in example 5, except that 2,6-toluenediamine bis(salicylamide) was used.

After approximately 30 hours stirring in epichlorohydrin at 60° C., a precipitate began to form. After 68 hours, liquid chromatography indicated the solid was the desired diepoxide adduct of the 2,6-toluenediamine bis(salicylamide). The slurry was filtered, washed with additional epichlorohydrin and vacuum dried in a vacuum oven to yield 9.5 g (80.2% of theory) of a crystalline solid with a melting point of 211°–213° C. The epoxy content was 16.9%.

EXAMPLE 7

Preparation of the Diglycidylether of a Mixture of 2,4- and 2,6-Toluenediamine Bis(Salicylamides)

A mixture consisting of 7.24 grams of 2,4-toluenediamine bis(salicylamide) and 1.81 grams of 2,6-toluenediamine bis(salicylamide) was stirred at 60° C. with 46.25 grams of epichlorohydrin and 0.23 gram of a 60% aqueous solution of benzyltrimethylammonium chloride for 72 hours. Liquid chromotography revealed the reaction product to contain a mixture of the chlorohydrin-epoxy adducts, the composition of which changed very little after 60 hours.

Then 15.6 grams of an aqueous solution consisting of 16.0% sodium hydroxide and 9.0% sodium carbonate was added to the above solution of adducts in epichlorohydrin and the mixture stirred at 30° C. for 1½ hours. The organic phase was separated and again stirred for 1 hour at 30° C. with the same amount of caustic-carbonate solution. The organic phase was then separated and water washed till free of caustic and salt. The excess epichlorohydrin was then removed by vacuum distillation to yield 11.9 grams of the desired product, (100.4% of theory). The semi-solid product had an epoxide content of 19.9%.

EXAMPLE 8

Preparation of the Diglycidylethers of a mixture of Ethylenediamine Bis(Salicylamide) and 2,4-toluenediamine Bis(Salicylamide)

(A) 50/50 Mixture

Ethylenediamine bis(salicylamide) 15.0 g (0.2 eq) and 18.1 g (0.1 eq) of 2,4-toluenediamine bis(salicylamide), 92.5 g (1.0 eq.) of epichlorohydrin and 0.46 g (0.0015 eq) of a 60% aqueous solution of benzyltrimethylammonium chloride were stirred together at 60° C. for 98 hours. Liquid chromotography showed the expected distribution of chlorohydrin and epoxy products.

Then 62.5 g of an aqueous solution consisting of 16.0% sodium hydroxide and 9.0% sodium carbonate was added and the mixture stirred at 30° C. for 90 minutes. The organic layer was separated and treated a second time with the same amount of caustic carbonate solution for an additional 30 minutes. The organic layer was separated, 100 g of methylene chloride added, and then washed with water till free of salt and caustic. The epichlorohydrin and methylene chloride were removed by vacuum distillation to yield a crystalline solid, melting point 48°–52° C. The epoxide content was 18.1%.

(B) 66.7/33.3 Mixture respectively

Ethylenediamine bis(salicylamide) 22.5 g (0.15 eq) and 13.58 g (0.075 eq) of 2,4-toluenediamine bis(salicylamide) 124.9 g (1.35 eq) of epichlorohydrin and 0.7 g (0.00225 eq) of a 60% aqueous solution of benzyltrimethylammonium chloride were stirred at 60° C. for 50 hours, after which liquid chromotography showed no further change in the distribution of the expected chlorohydrin-epoxy adducts.

An aqueous solution, 70.3 g, consisting of 16.0% sodium hydroxide and 9.0% sodium carbonate was stirred with the above epichlorohydrin solution of chlorohydrin products for 90 minutes at 30° C. Methylene chloride (160 g) was added, then the organic layer separated and again treated with an equal amount of caustic-carbonate solution for 30 minutes at 30° C. The organic layer was then separated, washed with water until free of salt and caustic and the methylene chloride and epichlorohydrin removed by vacuum distillation to yield 51 g of a crystalline solid, melting point 66°–70° C. The epoxy content was 20.5%. The shelf stability was 0.8% change in epoxy content per month as tested over a two (2) month period.

(c) 75/25 Mixture respectively

Ethylenediamine bis(salicylamide) 36.0 g (0.24 eq) and 14.48 g (0.08 eq) of 2,4-toluenediamine bis(salicylamide), 177.0 g (1.92 eq) of epichlorohydrin, and 0.99 g (0.0032 eq) of a 60% aqueous solution of benzyltrimethylammonium chloride were stirred at 60° C. for 48 hours until no further change was noted by liquid chromatography analysis.

To the chlorohydrin intermediates in epi were added 100 g of an aqueous solution consisting of 16.0% sodium hydroxide and 9.0% sodium carbonate. This mixture was stirred at 30° C. for 90 minutes, then 230 g of methylene chloride were added and the organic layer separated and again stirred for 30 minutes at 30° C. with the same amount of aqueous caustic-carbonate solution. The organic layer was then separated, washed with water until free of salt and caustic, then the epichlorohydrin and methylene chloride removed by vacuum distillation to yield 65 g (95% of theory) of a crystalline solid, melting point 88°–92° C. The epoxy content was 18.6%. The shelf stability was 0.44% change in epoxy content per month as determined over a nine (9) month period.

EXAMPLE 9

Preparation of the Tetraepoxy derivative of 2,4-toluenediamine Bis(Salicylamide)

The above amine [2,4-toluenediamine bis(salicylamide)], 22.63 g (0.0625 mole); epichlorohydrin, 115.6 g (1.25 moles) and 1.16 g (0.00375 eq) of a 60% aqueous solution of benzyltrimethylammonium chloride were heated to 70° C. under 190–195 mm of Hg vacuum. To this mixture with good stirring, 24 g (0.3 eq) of 50% aqueous caustic was added during approximately 3 hours. During the caustic addition, the water was continuously removed via its azeotrope with epichlorohydrin. The epichlorohydrin was separated from the water and returned to the reaction media. After all the caustic was added, the reaction was stirred at 79°–81° C. for 15 minutes, then cooled and the salt filtered from the organic solution. The organic layer was then water washed until free of salt and caustic, then the epichlorohydrin vacuum stipped to yield 35.7 g of a solid resin, melting point 103°–107° C. The epoxy content was 21.9%.

COMPARATIVE EXPERIMENT A (Preparation of Diglycicylbenzamide)

Benzamide 96.9 g (0.8 mole), epichlorohydrin 740 g (8.0 moles) and 7.42 g (0.024 mole) of a 60% aqueous solution of benzyltrimethylammonium chloride were heated at 60° C. under a vacuum of 60 mm of Hg. Fifty percent aqueous sodium hydroxide (153.6 g, 1.92 moles) was slowly added during approximately 3 hours while continuously removing the water as its azeotrope with epichlorohydrin. The epichlorohydrin was separated from the water and returned to the reaction media. After all the sodium hydroxide was added, the reaction was maintained at 60° C. for an additional 15 minutes, then cooled and filtered to remove the salt. The organic phase was washed with water until free of salt and sodium hydroxide, then the epichlorohydrin was vacuum distilled to yield 188.3 g (101% of theory) of a low viscosity yellow liquid. The epoxy content was 34.23%. The resin had a shelf-stability of 1.4% change in epoxy content per month as determined over a twelve (12) month period.

COMPARATIVE EXPERIMENT B (Preparation of Tetraglycidylisophthalamide)

Isophthalamide 49.2 g. (0.3 mole), epichlorohydrin 666 g (7.2 moles) and 5.55 g (0.018 mole) of a 60% aqueous solution of benzyltrimethylammonium chloride were heated at reflux (116° C.) for one hour, then cooled to 60° C. Then under a vacuum of 90–100 mm of Hg, 115.2 g (1.44 moles) of 50% aqueous sodium hydroxide was slowly added during approximately 2½ hours while continuously removing the water as its azeotrope with epichlorohydrin. The epichlorohydrin was separated from the water and returned to the reaction media. After all the sodium hydroxide was added, the reaction was maintained at 60° C. for an additional 30 minutes, then cooled and filtered to remove the salt. The organic phase was then washed with water until free of salt and sodium hydroxide, then the epichlorohydrin was vacuum distilled to yield 24.5 g (21.0% of theory) of a dark brown, viscous liquid. The epoxy content was 39.23%. The resin had a shelf stability of 1.7 percent change in epoxy content per month as determined over a seventeen (17) month period.

The cured properties of the epoxy resins obtained in the above examples and comparative experiments are given in the following table.

TABLE

| PROPERTY | RESIN FROM EXAMPLE OR COMPARATIVE EXPERIMENT | | | | | | | | | | |
| --- | --- | --- | --- | --- | --- | --- | --- | --- | --- | --- | --- |
| | 2 | 3 | 4 | 5 | 6 | 7 | 8A | 8B | 9 | A | B |
| SELF-CURE | | | | | | | | | | | |
| Gel time @ 150° C., min. | 30 | 120 | >180 | 120 | N.D. | N.D. | N.D. | N.D. | 40 | >1000 | ~60 |
| Tg (16 hrs @ 150° C. + 1 hr. at 200° C.), °C. | N.D.* | 135–150 | 122 | 171 | N.D. | N.D. | 155 | 152 | 150 | N.D. | Rubbery |
| Gel time @ 200° C., min. | N.D. | 12.5 | 20 | N.D. | N.D. | N.D. | N.D. | N.D. | 3.5 | N.D. | N.D. |
| Tg (4 hrs @ 200° C.), °C. | N.D. | 112 | 112 | 170 | 187 | N.D. | N.D. | N.D. | N.D. | N.D. | N.D. |
| Gel time @ 232° C., min. | N.D. | 3.25 | 5.8 | 2.75 | 7 | N.D. | N.D. | N.D. | 1.5 | N.D. | N.D. |
| Tg (1 hr. @ 232° C.), °C. | N.D. | 112 | 95 | 140 | 175 | N.D. | N.D. | N.D. | 150 | N.D. | N.D. |
| METHYLENE DIANILINE | | | | | | | | | | | |
| Gel time @ 150° C., sec. | 60 | 12–15 | 15–20 | 120–180 | N.D. | N.D. | 15–20 | N.D. | N.D. | >25000 | 120 |
| Tg (1 hr @ 150° C. + 1 hr @ 200° C.), °C. | 127 | 150 | 153 | 168 | N.D. | N.D. | 162 | N.D. | N.D. | ~40 | 107. |
| NADIC METHYL ANHYDRIDE | | | | | | | | | | | |
| Gel time @ 150° C., min. | 1.5 | N.D. | 15 | N.D. | N.D. | N.D. | N.D. | N.D. | N.D. | 12 | N.D. |
| Tg (1 hr @ 150° C. + | | | | | | | | | | | |

TABLE-continued

| | RESIN FROM EXAMPLE OR COMPARATIVE EXPERIMENT | | | | | | | | | | |
|---|---|---|---|---|---|---|---|---|---|---|---|
| PROPERTY | 2 | 3 | 4 | 5 | 6 | 7 | 8A | 8B | 9 | A | B |
| 1 hr @ 200° C.), °C. | 142 | N.D. | 137 | N.D. | N.D. | N.D. | N.D. | N.D. | N.D. | 83 | N.D. |

*N.D. — not determined

From the preceding data for the resins of comparative experiments A and B, it is evident that the diglycidylbenzamide (comparative experiment A) does not have a crystalline melting point since it was a liquid and does not readily self cure as indicated by the >1000 minutes, 150° C. gel time also, when cured with methylenedianiline, the gel time was over 25,000 seconds compared to 12-180 seconds for the epoxy resins of this invention, and that the tetraglycidylisophthalamide (comparative experiment B) does not have a crystalline melting point since it was a viscous liquid and when self-cured, only formed a rubbery mass as compared to a hard solid with Tg's of 122° to 171° C.

EXAMPLE 10

Diethylenetriamine tris(salicylamide) 30.86 g (0.2 eq) was stirred at 60° C. with 111 g (1.2 eq) of epichlorohydrin and 0.62 g of a 60% aqueous solution of benzyltrimethylammonium chloride for 117 hours. Then an additional 0.62 g of a 60% aqueous solution of benzyltrimethylammonium chloride was added and the reaction continued for an additional 24 hours.

Then 55.5 g of methylene chloride was added to the above solution followed by 62.5 g of an aqueous solution of 16.0% sodium hydroxide and 9.0% sodium carbonate and this mixture stirred at 30° C. for one and one-half hours. The organic layer was then separated from the aqueous phase and an additional 55.5 g of methylene chloride added and again treated with 62.5 g of aqueous caustic-carbonate solution for one hour at 30° C. The organic phase was then separated from the aqueous phase and washed with water until free of salt and caustic, then the excess epichlorohydrin and methylene chloride was removed by vacuum distillation to yield the desired epoxy product. The epoxy content was 16.2%.

EXAMPLE 11

The polysalicylamide of a formaldehydeaniline condensation product (average nitrogen functionality 2.47) 20.4 g (0.2 eq) was stirred at 60° C. with 111.0 g of epichlorohydrin (1.2 moles) and 0.62 g of a 60% aqueous solution of benzyltrimethylammonium chloride for 97 hours.

Then 55.5 g of methylene chloride was added to the above solution followed by 62.5 g of an aqueous solution of 16.0% sodium hydroxide and 9.0% sodium carbonate and this mixture stirred at 30° C. for one and one-half hours. The organic phase was then separated from the aqueous phase and treated as above with 55.5 g of methylene chloride and 62.5 g of caustic-carbonate solution for one hour at 30° C. The organic phase was then washed with water until free of salt and caustic, then the epichlorohydrin and methylene chloride was removed under vacuum to yield the epoxy product. The solid product has a melting point of 60°-64° C., and an epoxy content of 14.05%.

EXAMPLE 12

The bis(salicylamide) of 1,2-propylenediamine 3.25 g (0.25 eq), 115.62 g (1.25 moles) of epichlorohydrin, 38.72 g of monomethyl ether of propylene glycol and 10.8 g of water were heated to 70° C. Then with good stirring 8.64 g (0.0475 mole) of 22% aqueous solution of sodium hydroxide was added during approximately 2-3 minutes. This mixture was stirred for a total of 15 minutes, then 32.3 g (0.178 mole) of additional 22% aqueous sodium hydroxide was continuously added during 35 minutes, then stirred for an additional 10 minutes. The aqueous layer was then separated and discarded. An additional 15.9 g (0.0875 mole) of 22% aqueous caustic was then added to the remaining organic phase at 70° C. during approximately 17 minutes. The reaction was allowed to continue for approximately 13 minutes. The organic phase was then separated and water washed until free of salt and caustic. The product was obtained by vacuum distilling the excess epichlorohydrin and monomethyl ether of propylene glycol to yield a product with an epoxy content of 19.0%.

We claim:

1. An epoxy resin or mixture of epoxy resins represented by the following formulas I, II or III

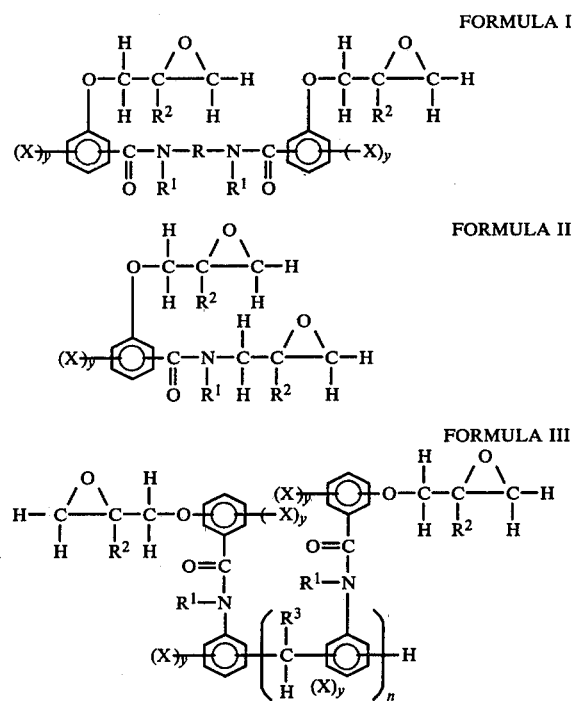

wherein each R is a divalent hydrocarbyl group having from 1 to about 18 carbon atoms, a group represented by the following formulas IV, V, VI or VII

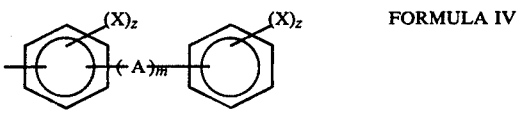

-continued

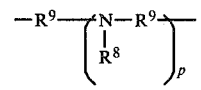
FORMULA V

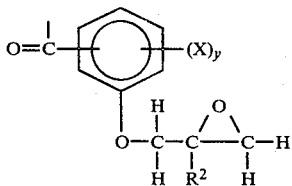
FORMULA VI $$-\left(R^9-N-R^9\right)_p$$
$$\phantom{-R^9-}|\phantom{R^9}$$
$$\phantom{-R^9-}R^8$$
FORMULA VII or R can combine with $R^1$ so as to form a stable heterocyclic ring with the nitrogen atoms; each A is independently a divalent hydrocarbyl group having from 1 to about 10 carbon atoms, —O—, —S—, —S—S—, $$-\overset{O}{\underset{\|}{C}}-,\ -\overset{O}{\underset{\|}{S}}-\ \text{or}\ -\overset{O}{\underset{\underset{\|}{O}}{\overset{\|}{S}}}-;$$

each $R^1$ is independently hydrogen, a 2,3-epoxypropyl group, a 2-alkyl-2,3-epoxypropyl group, a monovalent hydrocarbyl group, or a hydroxyl substituted monovalent hydrocarbyl group, said hydrocarbyl groups having from 1 to about 9 carbon atoms, said alkyl having from 1 to about 4 carbon atoms; each $R^2$ and $R^3$ is independently hydrogen or an alkyl group having from 1 to about 4 carbon atoms; each $R^4$ is independently hydrogen, a hydrocarbyl group or a halogen substituted hydrocarbyl group having from 1 to about 9 carbon atoms; each $R^8$ is independently selected from the group represented by the following formula XIV

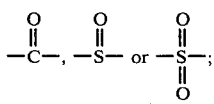
FORMULA XIV or the same group as $R^1$ except that $R^8$ cannot be hydrogen; each $R^9$ is a divalent hydrocarbyl group having from two to about 4 carbon atoms; each X is independently hydrogen, chlorine, bromine or a hydrocarbyl or hydrocarbyloxy group having from 1 to about 9 carbon atoms; each m independently has a value of zero or 1; n has an average value of from about 0.01 to about 6; p has an average value of from 1 to about 10; q has an average value of at least 1; and each y and z independently has a value of 1 or 2.

2. An epoxy resin or mixture of epoxy resins of claim 1 wherein each R is independently a divalent hydrocarbyl group having from 2 to about 12 carbon atoms or two such groups each having from 2 to about 4 carbon atoms; A is a divalent hydrocarbyl group having from 1 to about 4 carbon atoms, each $R^1$, $R^2$, $R^3$ and X is hydrogen; each $R^4$ is independently hydrogen or an alkyl group having from 1 to about 2 carbon atoms; each $R^9$ is a divalent hydrocarbyl group having 2 carbon atoms; each X is hydrogen and m has a value of 1.

3. A composition containing at least one 2,3-epoxypropyl, 2,3-epoxypropoxy, 2-alkyl-2,3-epoxypropyl or 2-alkyl-2,3-epoxypropoxy group per molecule and at least one 2-hydroxy-3-halopropyl, 2-alkyl-2-hydroxy-3-halopropyl, 2-hydroxy-3-halopropoxy or 2-alkyl-2-hydroxy-3-halopropoxy group per molecule, said composition being represented by the following formulas XI, XII or XIII;

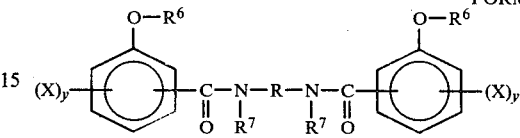
FORMULA XI

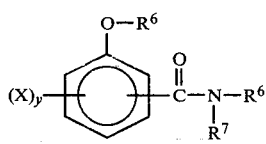
FORMULA XII

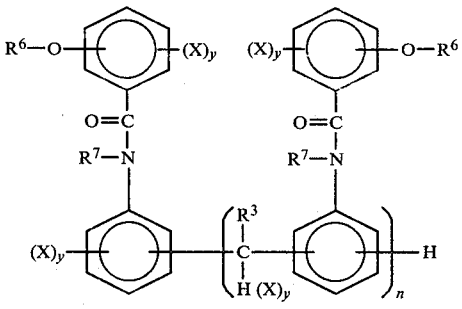
FORMULA XIII wherein each R is a divalent hydrocarbyl group having from 1 to about 18 carbon atoms, a group represented by the following formulas IV, V, VI or VII

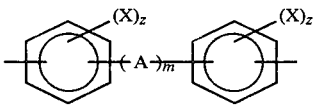
FORMULA IV

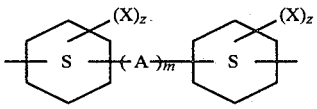
FORMULA V

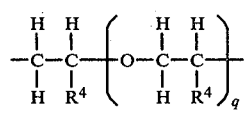
FORMULA VI

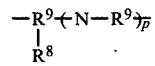
FORMULA VII or R can be combined with $R^5$ so as to form a stable heterocyclic ring with the nitrogen atoms; each A is independently a divalent hydrocarbyl group having from 1 to about 10 carbon atoms, —O—, —S—, —S—S—,

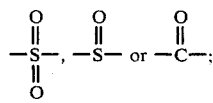

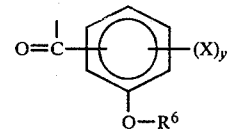

each X is independently hydrogen, chlorine, bromine or a hydrocarbyl or hydrocarbyloxy group having from 1 to about 9 carbon atoms; each $R^3$ is hydrogen or an alkyl group having from 1 to about 4 carbon atoms; each $R^4$ is independently hydrogen, a hydrocarbyl or halogen substituted hydrocarbyl group having from 1 to about 8 carbon atoms; each $R^6$ is independently a 2,3-epoxypropyl, a 2-alkyl-2,3-epoxypropyl, a 2-hydroxy-3-halopropyl or a 2-alkyl-2-hydroxy-3-halopropyl group said alkyl group having from 1 to about 4 carbon atoms; each $R^7$ is independently hydrogen, a monovalent hydrocarbyl group, a hydroxyl substituted monovalent hydrocarbyl group, said hydrocarbyl groups having from 1 to about 9 carbon atoms or a group defined by $R^6$; and each $R^8$ is independently selected from a group represented by the following formula XVI or the group represented by $R^6$; each $R^9$ is independently a divalent hydrocarbyl group having from 2 to about 4 carbon atoms; each m independently has a value of zero or 1; n has an average value of from about 0.01 to about 6; p has an average value of from 1 to about 10; q has a value of at least 1; each y and z independently has a value of 1 or 2; and with the proviso that at least one of $R^6$ or $R^7$ is a 2-alkyl-2,3-epoxypropyl or a 2,3-epoxypropyl group and at least one of $R^6$ or $R^7$ is a 2-hydroxy-3-halopropyl or a 2-alkyl-2-hydroxy-3-halopropyl group.

4. A composition of claim 3 wherein each R is independently a divalent hydrocarbyl group having from 2 to about 12 carbon atoms or 2 such groups each having from 2 to about 4 carbon atoms; A is a divalent hydrocarbyl group having from 1 to about 4 carbon atoms; each $R^3$, $R^7$ and X is hydrogen; $R^4$ is hydrogen or an alkyl group having from 1 to about 2 carbon atoms; each $R^6$ is independently selected from 2,3-epoxypropyl and 2-hydroxy-3-chloropropyl; $R^9$ is a divalent hydrocarbyl group having 2 carbon atoms and m has a value of 1.

* * * * *